United States Patent Office 3,072,727
Patented Jan. 8, 1963

3,072,727
PROCESS FOR THE PREPARATION OF KETALS
William L. Howard and Nicholas B. Lorette, Lake Jackson, Tex., assignors to The Dow Chemical Company, Midland, Mich., a corporation of Delaware
No Drawing. Filed Mar. 2, 1959, Ser. No. 796,289
8 Claims. (Cl. 260—611)

The present invention relates to a new and useful process for the preparation of ketone acetals, and more particularly relates to a new and novel process for the preparation of ketone acetals by the reaction of monohydric secondary alcohols with simple alkyl acetals of ketones.

Recently ketals of monohydric secondary alcohols having a hydroxyl in the ketone moiety have been reported. These compounds are prepared by the reaction of a substituted hydroxy oxirane with a monohydric secondary alcohol. These compounds are claimed to be the first group representatives of the class of compounds comprising the ketals of monohydric secondary alcohols. The hydroxyl group on the ketone moiety results from the fact that these unique compounds are prepared from epoxy ethers by the opening of the 3-membered oxirane ring by the secondary alcohol. The ring opening is asserted to be the driving force of the reaction, and it is pointed out that the preparation of ketals of secondary alcohols by ordinary methods is difficult if not impossible. It is also stated that the reaction is an alcohol interchange on a ketal (the epoxy ether) with a special driving force. The paper in which these compounds are recorded is C. L. Stevens et al., J. Am. Chem. Soc., 80, 2276 (1958). The epoxy ethers from which the known ketals of monohydric secondary alcohols are prepared require tedious and difficult methods for their preparation.

It is an object of the present invention to provide a process for the preparation of ketals of monohydric secondary alcohols from commercially available materials. It is a further object to provide a process for the preparation of ketals of monohydric secondary alcohols in which the by-products thereof can be recovered and re-employed. It is a still further object to provide a process for the preparation of ketals of monohydric secondary alcohols which requires no special driving force in the reaction. These and other objects will become apparent to those skilled in the art from the following description and claims.

In carrying out the process of the present invention a ketone lower dialkyl acetal is reacted by mixing with a monohydric secondary alcohol in the presence of a catalytic amount of a strong acid. The reaction proceeds readily at temperatures of from about room temperature to about 100° C. The products obtained by the foregoing reaction depend upon the ratio of reactants and the temperature of the reaction. Thus, if substantially complete alcohol interchange is desired, i.e., symmetrical sec-alkoxy replacement of methoxy, then a proportion of two moles of alcohol, or greater, per mole of ketone dimethyl acetal is required. Proportions of from two to one to 20 to one may be used, but proportions of less than 10 to one are preferred as the effects of increasing the proportion beyond this are not significant.

On the other hand, if unsymmetrical dialkyl ketals are desired, proportions of up to one mole of alcohol per mole of ketone dimethyl acetal are preferred. When proportions of greater than one but less than two moles of alcohol per mole of ketone dimethyl acetal are employed, a mixture of symmetrical and unsymmetrical ketals results.

Any unsymmetrical ketals obtained may be converted to symmetrical ketals by a disproportionation reaction using the same acid catalyst as before and at a preferred temperature of from about 0° C. to 100° C. to avoid the formation of the unsaturated ether as a by-product.

Substantially any ketone dialkyl acetal can be employed as starting material in the process of the present invention specifically those ketone dialkyl acetals having the formula

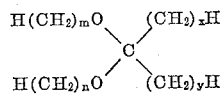

wherein the symbols $m$, $n$, $x$ and $y$ each represent an independent integer from 1 to 4, inclusive and in which groups designated $x$ and $y$ may be connected to form a cyclohexyl radical. Some of such compounds are, for example, acetone dimethyl acetal, cyclohexanone dimethyl acetal, butanone dimethyl acetal, 3-pentanone dimethyl acetal and the like.

Substantially any aliphatic or alicyclic monohydric secondary alcohol may be employed in accordance with the present invention. Thus for example, isopropyl alcohol, secondary butyl alcohol, 4-methyl-2-pentanol, cyclohexanol, and the like may be employed.

The acid catalysts are those well known in the art, such as, for example, sulfuric acid, p-toluenesulfonic acid, hydrochloric acid, sulfonic acid ion exchange resins, and the like.

The following examples illustrate the present invention but are not to be construed as limiting:

*Example 1.—Isopropyl Acetals of Acetone*

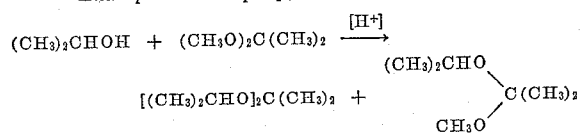

A solution containing 470 g. of acetone dimethyl acetal (550 ml., 4.5 moles) and 1070 g. of isopropyl alcohol (1350 ml., 17.8 moles) was acidified with 0.07 g. of p-toluenesulfonic acid which caused the temperature to drop 5° almost immediately. The mixture was set aside at room temperature for two days. The catalyst was then inactivated by the addition of a slight excess of base (sodium methylate), the mixture was set for fractional distillation, and 340 ml. of an azeotrope of acetone dimethyl acetal and methanol was removed. The mixture was acidified again and after a few minutes again made basic. Another 105 ml. of the azeotrope was taken off. The distilland was then diluted with about seven liters of water containing enough sodium hydroxide to render it alkaline to phenolphthalein, and the ketals were extracted into benzene. The benzene extract was washed with water to remove alcohols and dried with potassium carbonate. Fractional distillation of the dried benzene solution gave 96 g. of material boiling at 46°/64 mm. and 70 g. of material boiling at 69–70°/64 mm. along with 64 g. of intermediate cuts and residue from column holdup.

The 96 g. of lower-boiling material was redistilled and gave 76 g. of liquid of B.P. 47°/68 mm., $n_D^{25}$ 1.3882, density 0.83 g./ml., with infrared spectrum typical of ketals: identified as acetone isopropyl methyl acetal; yield, 13 percent.

*Analysis.*—Calcd. for $C_7H_{16}O_2$: C, 63.60; H, 12.20. Found: C, 63.58, 63.72; H, 12.05, 12.34.

The 70 g. liquid boiling at 69–70°/64 mm. had $n_D^{26}$ 1.3970, density 0.83 g./ml., and infrared spectrum typical of ketals: identified as acetone diisopropyl acetal; yield 10 percent.

*Analysis.*—Calcd. for $C_9H_{20}O_2$: C, 67.45; H, 12.58. Found: C, 67.40, 67.29; H, 12.44, 12.36.

Yield figures represent isolated pure material based on amount of acetone dimethyl acetal taken.

Example II.—Sec-Butyl Acetals of Acetone

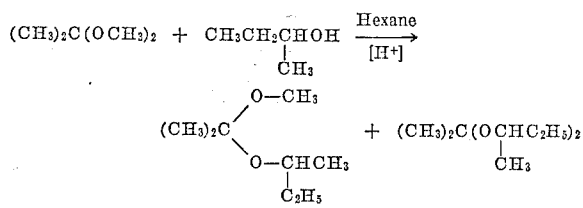

A solution composed of 1500 ml. (12.1 moles) of acetone dimethyl acetal, 1600 ml. (17.4 moles) of sec-butyl alcohol, 0.4 g. p-toluenesulfonic acid and 1300 ml. hexane was distilled at atmospheric pressure. Cuts of 600 to 800 ml. were collected and after each cut an equal volume of hexane was added to the distillation flask. After collecting 3230 ml. of hexane-methanol distillate, the reaction mixture was made basic with 0.2 g. of sodium methylate dissolved in methanol. The distillation was continued, first at atmospheric pressure until the distillation flask temperature reached 90–100° C. and then at reduced pressure as needed to maintain an overhead temperature of 40–80° C. A total of 795 ml. of acetone sec-butyl methyl acetal and 263 ml. of acetone di-sec-butyl acetal was obtained. These volumes represent yields, based on starting acetone dimethyl acetal, of 38 and 10 percent respectively. Acetone sec-butyl methyl acetal: $n_D^{25}$ 1.3986; $d_{26}$ 0.8368; B.$_{50}$ 61°.

*Analysis.*—Calcd. for $C_8H_{18}O_2$: C, 65.71; H, 12.46. Found: C, 65.74, 65.90; H, 12.58, 12.66.

Acetone di-sec-butyl acetal: $n_D^{26}$ 1.4118; $d_{26}$ 0.8337; B.$_{12}$ 67°.

*Analysis.*—Calcd. for $C_{11}H_{24}O_2$: C, 70.16; H, 12.85. Found: C, 70.28, 70.09; H, 12.85, 13.03.

Example III.—Cyclohexanone Dicyclohexyl Acetal

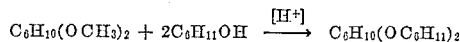

A solution containing 288 g. of cyclohexanone dimethyl acetal (304 ml., 2.0 moles) and 400 g. of cyclohexanol (416 ml., 4.0 moles) was acidified with 0.25 g. of p-toluenesulfonic acid. After standing for four days at room temperature, the solution was diluted with 750 ml. of cyclohexane and distilled at atmospheric pressure to remove methanol as its azeotrope with cyclohexane, the latter also serving to reduce the temperature of the distilland necessary to remove the methanol, and 400 ml. of distillate was collected at head temperatures between 54° and 77°. Extraction of the distillate with water left an organic phase of 257 ml., indicating a content of 143 ml. of water-soluble material in the distillate (theoretical, 164 ml.). The aqueous phase increased by approximately this amount. During the distillation the temperature of the reaction solution stayed in the range of 85°–90° C. The distilland was then made basic by addition of excess sodium methylate. Excess cyclohexane and 93 ml. of liquid boiling in the cyclohexanone dimethyl acetal and cyclohexanol range were removed by distillation. Infrared spectrum of the residue had the appearance of a cyclohexanone ketal.

Distillation of a small portion of the residue through a column packed with a three inch length of Berl saddles gave four crude fractions boiling from 40–95°, 95–110°, 110–150°, and 150–160° at 4 mm. Seed crystals were prepared from the 150–160° material and used to induce crystallization in the main portion of the reaction mixture. By alternately chilling and filtering most of the crystallizable material was separated. Recrystallization several times from ethyl ether gave finally 160 g. of crystalline product melting from 42–44°. A small sample prepared for analysis had M.P. 43.0–43.5°; cyclohexanone dicyclohexyl acetal, yield 29 percent.

*Analysis.*—Calcd. for $C_{18}H_{32}O_2$: C, 77.09; H, 11.50. Found: C, 77.00, 77.12; H, 11.61, 11.69.

Example IV.—Disproportionation of Acetone Isopropyl Methyl Acetal

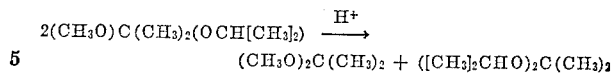

A few crystals of p-toluenesulfonic acid were dissolved in 142 g. of acetone isopropyl methyl acetal (1.08 moles). After five days at room temperature the catalyst was inactivated by addition of excess sodium methylate. Fractional distillation gave the following materials:

| Fraction | Wt. (g.) | Boiling Range, °C./P | Refractive Index, $N_D/T$ | Composition |
|---|---|---|---|---|
| I | 21 | 40–8°/205 | 1.3767/24 | acetone dimethyl acetal. |
| II | 13 | 48–73°/205 | 1.3844/24 | mixture, mostly acetone isopropyl methyl acetal. |
| III | 61 | 73–4°/205 | 1.3890/24 | acetone isopropyl methyl acetal. |
| IV | 7 | 40–59°/40 | 1.3954/24 | mixture. |
| V | 6 | 59°/40 | 1.3977/25 | acetone diisopropyl acetal. |
| Residue | 11 | | | see below. |
| Cold Trap | 11 | | 1.3795/24 | see below. |

The residue above was flash distilled and gave 10 g. of material, B.P. 61.5°/42 mm., $n_D^{25}$ 1.3980: acetone diisopropyl acetal. The cold trap material was probably a mixture of alcohol and isopropenyl ether resulting from pyrolysis of the ketals. It became hot on addition of a crystal of p-toluenesulfonic acid, and then became cold on addition of water, behavior characteristic of such a mixture. The heat comes from the exothermic addition of alcohol to ether; the cooling results from endothermic hydrolysis of the ketal produced by the addition reaction.

Example V.—Disproportionation of Acetone Sec-Butyl Methyl Acetal

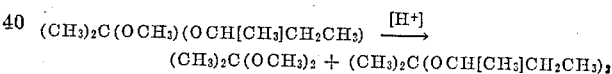

Four moles (585 g.) of acetone sec-butyl methyl acetal was acidified with 0.2 g. of p-toluenesulfonic acid. After five hours at room temperature the sample was made basic with 0.3 g. of sodium methylate dissolved in 10 ml. of methanol. The solution was distilled at reduced pressure to give a fraction of acetone dimethyl acetal, 290 g. of acetone sec-butyl methyl acetal and a residue of 113 g. of acetone di-sec-butyl acetal (confirmed by infrared spectrum). The theoretical yield of acetone di-sec-butyl acetal would be 188 g. (1 mole). On this basis the yield of acetone di-sec-butyl acetal was 60 percent.

Example VI

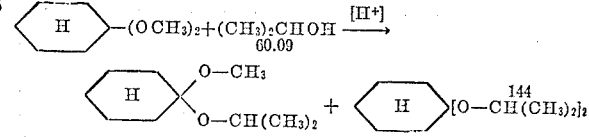

A solution composed of 600 ml. (4 moles) of cyclohexanone dimethyl acetal, 608 ml. (8 moles) of isopropyl alcohol, 0.2 g. of p-toluenesulfonic acid and 650 ml. of hexane was slowly distilled. From time to time hexane was added to the reaction solution as needed to replace the distillate and to keep the temperature in the reaction flask below 85°. During the distillation the overhead temperature stayed at 52 to 56° and would drop to 48–50° (the true azeotrope boiling point) only on long reflux. After 1300 ml. of distillate had been collected, 200 ml. (2.63 moles) of isopropyl alcohol was added to the reaction solution. When a total of 1600 ml. of hexane solution had been collected, the reaction solution was made basic with a solution of sodium methylate dissolved in methanol. The reaction solution was distilled first at atmospheric pressure and then at reduced pressure to give a 30 percent yield of cyclohexanone methyl isopropyl acetal, B.$_8$ 68° C., $d_{24}$ 0.9185, $n_D^{24}$ 1.4390, and a 33 percent yield of cyclohexanone diisopropyl acetal, B.$_8$ 85° C., $n_D^{24}$ 1.4410, $d^{24}$ 0.9047.

*Analysis.*—Calcd. for $C_{10}H_{20}O_2$: C, 69.66; H, 11.70. Found: C, 69.75, 69.75; H, 11.82, 11.79. Calcd. for $C_{12}H_{24}O_2$: C, 71.95; H, 12.08. Found: C, 72.15, 72.28; H, 12.05, 11.95.

*Example VII.—Disproportionation of Cyclohexanone Diisopropyl Acetal and Cyclohexanone Dimethyl Acetal*

Equimolar amounts of cyclohexanone diisopropyl acetal (2.00 gm.) and of cyclohexanone dimethyl acetal (1.44 gm.) were mixed and acidified with a trace of p-toluenesulfonic acid. Infrared spectrum of the mixture indicated the presence of at least 35 percent cyclohexanone isopropyl methyl acetal along with the two starting acetals. The three acetals are easily separated by distillation as in Example III.

We claim:

1. A method for the preparation of ketals of monohydric secondary alcohols which comprises reacting by mixing and contacting a ketone dialkyl acetal, selected from the group consisting of those having the formulas

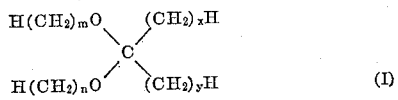

(I)

and

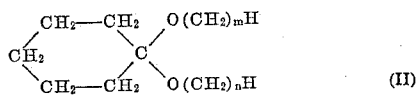

(II)

wherein $m$, $n$, $x$ and $y$ each represent an integer from 1 to 4, inclusive, with a secondary monohydric alcohol, selected from the group which consists of aliphatic and alicyclic alcohols containing from 3–6 carbon atoms, in the presence of a strong acid catalyst at a temperature between about room temperature and about 100° C., distilling off under acidic conditions during the course of the reaction the by-product alcohol formed from the reactant ketal, neutralizing the acid catalyst and, finally, recovering the formed ketone acetal corresponding to the starting ketal and having the formula selected from the group consisting of

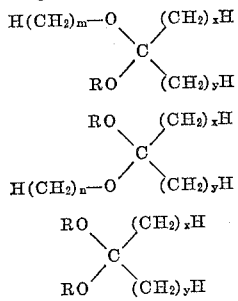

and, mixtures thereof when the starting ketal is I, and

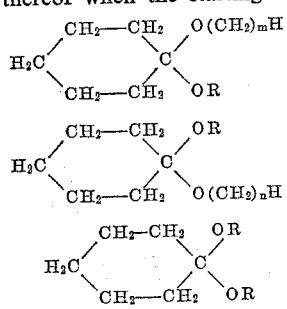

and, mixtures thereof when the starting ketal is II.

2. A method for preparing ketals which comprises reacting by mixing and contacting a ketal selected from the group consisting of ketals having the formulas

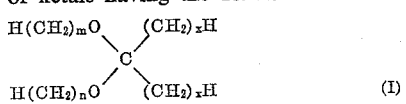

(I)

and

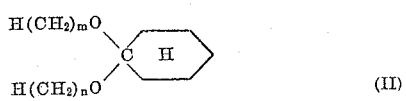

(II)

wherein the symbols $m$, $n$, $x$ and $y$ each represent an independent integer from 1 to 4 with from about 1 to about to about 20 molar equivalents of a secondary alcohol having the formula ROH and selected from the group consisting of secondary aliphatic alcohols having from 3 to 6 carbon atoms and cyclohexanol, in the presence of a strong acid catalyst at a temperature from about room temperature to about 100° C.; and, separating the ketal corresponding to the starting ketal and having a formula selected from the group consisting of

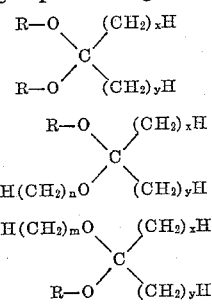

and mixtures thereof when the starting ketal is (I), and

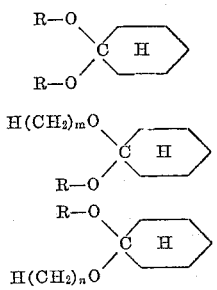

and mixtures thereof when the starting ketal is (II).

3. The method of claim 2 wherein said ketone dialkyl acetal is acetone dimethyl acetal.

4. The method of claim 2 wherein said ketone dialkyl acetal is cyclohexanone diamethyl acetal.

5. A method for preparing symmetrical disecondary ketals which comprises reacting by mixing and contacting a ketal selected from the group consisting of ketals having one of the formulas

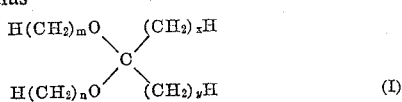

(I)

and

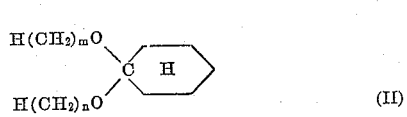

(II)

wherein the symbols $m$, $n$, $x$ and $y$ each represent an independent integer from 1 to 4 with at least two molar equivalents of a secondary alcohol having the formula ROH and selected from the group consisting of secondary aliphatic alcohols having from 3 to 6 carbon atoms and cyclohexanol, in the presence of a strong acid catalyst at a temperature from about room temperature to about 100° C., and, separating the ketal corresponding to the starting ketal and having the formula

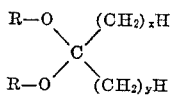

when the starting ketal is (I) and

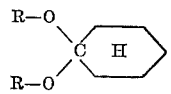

when the starting ketal is (II).

6. The method of claim 5 wherein said ketone dialkyl acetal is acetone dimethyl acetal.

7. The method of claim 5 wherein said ketone dialkyl acetal is cyclohexanone dimethyl acetal.

8. A method for preparing unsymmetrical secondary ketals which comprises reacting by mixing and contacting a ketal selected from the group consisting of ketals having the formulas

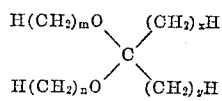 (I)

and

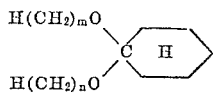 (II)

wherein the symbols $m$, $n$, $x$ and $y$ each represent an independent integer from 1 to 4 with up to about 1 molar equivalent of a secondary alcohol having the formula ROH and selected from the group consisting of secondary aliphatic alcohols having from 3 to 6 carbon atoms and cyclohexanol, in the presence of a strong acid catalyst at a temperature from about room temperature to about 100° C.; and, separating the ketal corresponding to the starting ketal and having a formula selected from the group consisting of

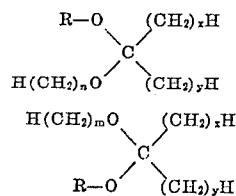

and mixtures thereof when the starting ketal is I, and

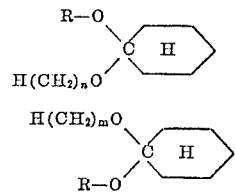

and mixtures thereof when the starting ketal is (II).

References Cited in the file of this patent

UNITED STATES PATENTS 2,229,665   Mochel _____ Jan. 28, 1941
2,875,252   Elam et al. _____ Feb. 24, 1959

OTHER REFERENCES

MacKenzie et al.: Organic Chemistry, vol. 20, No. 12 (1955), p 1700.

Crocker et al.: Jour. Chem. Soc., London (1955), pp. 2052–2053.

Grummitt et al.: Jour. Amer. Chem. Soc., vol. 77 (1955), pp. 3136–3138.

Kollonitsch et al.: Nature, No. 4545 (1956), p. 1307.